July 16, 1929.                    C. LONGHI                    1,720,910
           PROCESS OF TREATING MATERIAL IN LIQUID STATE ELECTROCHEMICALLY
                              Filed Dec. 12, 1924
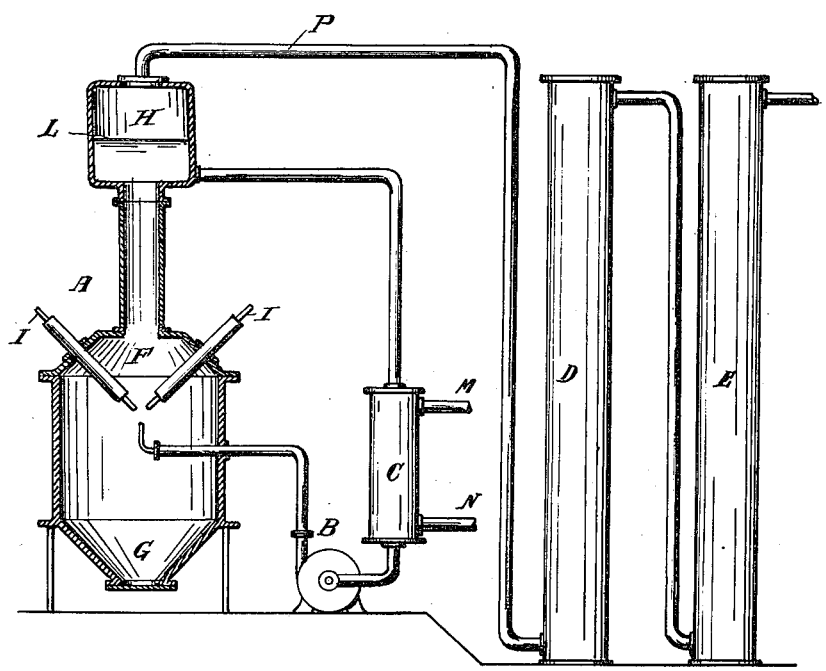

Patented July 16, 1929.

1,720,910

UNITED STATES PATENT OFFICE.

CARLO LONGHI, OF MILAN, ITALY.

PROCESS OF TREATING MATERIAL IN LIQUID STATE ELECTROCHEMICALLY.

Application filed December 12, 1924, Serial No. 755,561, and in Italy December 17, 1923.

Since the discovery made by Silliman at Newark in America in 1855 of the process of partial transformation of solid hydrocarbons or of hydrocarbons with high boiling points into volatile liquid hydrocarbons or into permanently gaseous hydrocarbons (cracking), though considerable modifications have been made in the original process, yet up to the present day this industry has always carried out the destruction of the primitive hydrocarbons at rather low temperatures, ranging, according to the method, from 200° to 650° C., that is to say under conditions that made the formation of acetylene impossible. The decomposition products from this cracking process which contain only a small percentage of acetylene were subsequently cooled solely to recover condensable substances contained in the said products.

The present invention on the contrary has for its object the employment of the instantaneous heating to a very high temperature of an electric arc which is caused to spring in a liquid internal portion of the mass of material undergoing treatment in such a manner as to cause the production of substantial quantities of acetylene. The invention further contemplates utilizing positive action for separating the aforesaid gaseous products after each arc discharge from the next arc discharge and before the effect of the arc on the gaseous products becomes unfavorable to the existence of the acetylene contained in said products or before the arc materially decomposes the acetylene constituent.

The mass of the liquid which is to be split or treated is kept at a relatively low temperature by rapid circulation through a suitable cooling device so that the liquid lying over the arc completely envelopes the gaseous products, separated by positive action after each arc has functioned from the subsequent arc discharges, and causes an almost instantaneous cooling of said products to a temperature lower than the decomposition temperature of acetylene. In this manner the gaseous products are moved quickly and almost immediately after each arc has functioned into cooler parts of the liquid whereby the acetylene content of said products is maintained at a relatively high proportion.

The very high temperature of the electric arc exerts a most effective splitting action on the material under treatment because of the fact that the calorific effect of the flame of the arc is about a maximum in the restricted space in which it works.

The splitting in the present case is far deeper than that which can be reached by the ordinary cracking process, and considerable quantities of gaseous hydrocarbons are generated. They are preserved from the decomposition to which they are readily liable, particularly the acetylene constituent, by means of the instantaneous cooling which, as already mentioned, is obtained by positively separating the gaseous products after each arc discharge from the next arc discharge and before the effect of the arc on the gaseous portions becomes unfavorable with respect to the constitution of the gaseous constituents, and incidentally effecting the complete envelopment of the gaseous products containing decomposition and synthesis products by the liquid material almost immediately after each arc has functioned, and thereupon moving the liquid-enveloped gaseous products quickly into cooler parts of the liquid lying over the arc, and thence, out of the body of organic liquid in directions other than those where said gases will be re-exposed to the influence of the electric arc. In this manner only is it practicable to achieve economical equilibrium conditions among the various gaseous products of the reaction.

The present invention may be advantageously applied to the splitting or electrochemical treatment of any liquid or readily fusible organic complex which is a poor conductor of electricity.

The following substances are to be specially mentioned as being adapted to this process: tars generally, crude oils whether obtained from the distillation of coal, of brown coal, of peat or of bituminous shale of endogenous or organic origin, and heavy oils generally.

The cracking performed by the electric arc splits all these organic complexes effectively and effects synthesis of the decomposition products and gives rise to a gas mixture possessing lighting power and high heating value, the mixture consisting of hydrocarbons of the paraffin series, of acetylene which is always present in high proportions, and of hydrogen; finely divided carbon (smoke-black) also results. This splitting is obtained with a very low consumption of electric energy.

The proportions of gases to the finely divided carbon depend upon the nature of the organic complex subjected to the splitting process.

Sulphur and nitrogen, which are mostly present in organic complexes, are transformed into sulphydric and cyanhydric acids which are evolved from the liquid mass along with the gases and are afterwards separated therefrom by the usual means.

The novel process permits of the utilization of organic complexes which thus far were not susceptible of an advantageous industrial utilization due to their high content of sulphur which cannot be eliminated by any chemical treatment.

The annexed drawing shows in diagrammatic form and merely by way of example a plant for practicing the process according to the invention, the plant being so designed as to permit the rapid interruption and resumption of work as well as a complete utilization of the electric energy. The electrical portion of the plant is very simple, the furnace service and maintenance being thus facilitated.

The hydrocarbons making up the gas mixture obtained by the novel process are susceptible of a quite large number of applications. We will mention some among the main ones:

The acetylene, the proportion of which in the gas mixture is considerably larger than that of any other constituent, can be separated from the other gases by the means of modern thermo-chemical methods, or it can be used in mingled condition, viz. without previous separation, for obtaining benzol, acetic aldehyde and derivatives thereof, cyanides etc., or for being polymerized.

The plant illustrated in the annexed diagrammatic drawing, may, without departing from the basic principle of its construction, receive the most varied forms according to the furnace capacity, the organic complexes to be cracked, and the final products aimed at.

For the generation of the electric arc, monophase, two-phase, three-phase or direct current may be used. The electrodes may be arranged horizontally, at a slant, or vertically. The voltage may be low, moderately high, or extra high. The furnace is gas tight and built entirely of metal. The electrodes may be fixed or movable, but in any case they shall be properly insulated. The arc may be continuous, and in such a case the blowing of the arc can be effected by causing the liquid to enter the arc zone under pressure, or the arc may be discontinuous and with a low or high voltage such as it is directly supplied by mercury rectifiers, with or without the intermediary of a step-up transformer, or in the form of disruptive arcs. In the latter case the successive primings may be effected either mechanically (as for instance in a three-phase system with synchronously rotating star center) or by means of an auxiliary current with a high tension and an industrial frequency or with a high frequency actuating a separate circuit or the furnace circuit so as to perforate the liquid dielectric and to promote the priming of the arc under the furnace industrial current.

In the annexed diagrammatic drawing, A is the furnace proper comprising a gas tight metal casing the shape of which may be varied to suit varying requirements; F is the furnace chamber in which the splitting caused by the electric arc takes place.

The carbon deposit (smoke-black) forms at G and can be partially removed from the circulation by a suitable separation without interrupting the operation of the furnace, whenever the conductivity of the organic complex should be too much increased by the presence of the carbon deposit. At the same time the carbon suspension in the liquid is a factor in the production of high yields of acetylene, and a certain degree of such suspension is therefore purposely maintained in the liquid. I prefer to maintain a suspension of a substantial amount of carbon particles throughout the body of the liquid and to recover the excess carbon resulting from the reactions by replacing portions of the liquid containing such excess carbon suspension by liquid having a lower carbon content, and thereafter to recover the carbon from the withdrawn portions of the liquid.

The chamber F is connected to a further chamber H arranged on top of F in order to receive the gases that form under the action of the electric arc.

In the furnace crucible A the electrodes I—I are fitted up, same being carefully insulated. Carbon or metal electrodes may be used, the same may be cooled if desired. The electrodes may be solid or made hollow or hollow for the passage of gaseous or liquid substances that may be conveyed into the arc zone in order to enrich the hydrocarbons supplied by the splitting process or in order to obtain other more or less liquefiable gases.

The pump B serves to circulate the liquid contents of the furnace A as well as to cool them down by forcing them through a suitable cooler or refrigerator C which is kept cool by circulation of water, M and N being the water inlet and outlet pipes for the refrigerator. In this manner the liquid is positively circulated through the arc region in the furnace and is positively cooled thereafter to lower the temperature of the body of liquid undergoing treatment. The body of organic liquid to be treated is maintained within the furnace at a level, such as in the drawings, higher than that of the electric arc discharges. An internal portion of the liquid mass is subjected to the action of recurring arc discharges which convert the affected liquid into decomposition products and syntheses products thereof. Each of the arcs is displaced and extended from its initial position, by applying a force effective within the body of liquid, to a final position where rupturing or breaking of the arc occurs. The bubbles of gas formed by the action of the arcs are moved by a positive action upwardly away from the arcing zone before subsequent successive arcs can materially decompose the acetylene constituent of said gas bubbles so that a complete envelopment of the decomposition and syntheses products contained in the gas bubbles by the organic liquid is effected almost immediately after each arc has functioned. The liquid-enveloped gaseous products are quickly moved in a positive manner into cooler parts of the liquid superposed above the arcs, and thence, out of the body of organic liquid in directions other than those where said gases will be re-exposed to the influence of the electric arcs.

The depth of the liquid layer superposed on the electric arc discharges or arcing zone has a great influence on the percentage of acetylene contained in the resultant gas mixture. I prefer to effect one control of the procedure by establishing a superposed column of liquid, maintained at a substantial depth, over the electric arc discharges.

From the top of the chamber H a pipe P leads the gases to the first purifier D, from whence it passes into a second purifier E in which the sulfhydric and cyanhydric acids present in the gas mixture are absorbed and separated from the rest of the gas mixture.

From the purifier E the gas is conveyed into a collecting and measuring reservoir, then to be distributed finally over the various works departments for the manufacture of the various products for which the gases obtained by the novel process can be used.

Having now particularly described and ascertained the nature of my said invention and in what manner the same is to be performed, I declare that what I claim is:—

1. The process of treating an organic material electrochemically, which comprises subjecting portions of the said material in liquid form within the body of such liquid to recurring electric arc discharges of a high temperature character, and quickly separating, by a positive action, the gaseous portion of the end products after each arc discharge from the next arc discharge and before the effect of the latter arc on the gaseous portions becomes unfavorable with respect to the constitution of said gaseous portions, whereby the acetylene content of said gas is maintained at a relatively high proportion.

2. The process for the production of acetylene-containing gases which comprises maintaining a body of organic liquid, subjecting an interior portion of said liquid to the action of recurring electric arc discharges of a high temperature character, applying a force effective within the body of liquid, to each arc tending to displace the arc from its initial position, breaking each arc very quickly after the formation of same, and before the arc materially decomposes the acetylene constituent and incidentally effecting the complete envelopment of the decomposition and synthesis products by the organic liquid almost immediately after each arc has functioned, and thereupon positively moving the liquid-enveloped gaseous products quickly into cooler parts of the liquid and thence, out of the body of organic liquid in directions other than those where said gases will be re-exposed to the influence of the electric arc.

3. The process as set forth in claim 2 in which a suspension of a substantial amount of carbon particles is maintained throughout the body of liquid and excess carbon resulting from the reactions is recovered by replacing portions of the liquid containing such excess carbon suspension by liquid with lower carbon content, and separating the carbon from the withdrawn portions of the liquid.

4. The process according to claim 2, wherein a portion of the finely divided carbon resulting from the demolition of the original hydrocarbon is maintained intimately suspended in the mass of liquid while the excess is recovered by gradually removing a portion of the liquid containing said excess and by replacing therefor a portion of the liquid from which separation of carbon has already been effected or with fresh liquid hydrocarbon.

5. The process as set forth in claim 2 in which the liquid is positively circulated through the arcing zone, and is positively cooled in order to maintain the produced gas at a temperature which is lower than the decomposition temperature of the produced acetylene.

6. A process as set forth in claim 2 in which one control of the procedure is effected by establishing a superposed column of liquid maintained at a substantial depth, over the electric arc discharges.

Signed at Milan (Italy), this 28th day of November, 1924.

CARLO LONGHI.